United States Patent
Michal, III (10) Patent No.: US 7,121,457 B2
(45) Date of Patent: Oct. 17, 2006

(54) AUTOMATICALLY ADJUSTING PARAMETERS OF A LIFTING DEVICE BY IDENTIFYING OBJECTS TO BE LIFTED

(75) Inventor: Neal Jay Michal, III, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/837,101

(22) Filed: Apr. 30, 2004

(65) Prior Publication Data

US 2005/0242169 A1    Nov. 3, 2005

(51) Int. Cl.
*G06F 17/00* (2006.01)

(52) U.S. Cl. ................................ 235/375; 235/487

(58) Field of Classification Search ............... 235/375, 235/383, 385, 487
See application file for complete search history.

(56) References Cited

U.S. PATENT DOCUMENTS

| | | | |
|---|---|---|---|
| 5,020,963 A * | 6/1991 | Okada ...................... 414/607 |
| 5,780,826 A * | 7/1998 | Hareyama et al. .......... 235/385 |
| 5,892,441 A * | 4/1999 | Woolley et al. ......... 340/539.26 |
| 6,027,302 A * | 2/2000 | Nilsson .................... 414/621 |
| 6,166,638 A | 12/2000 | Brady et al. |
| 6,256,566 B1 * | 7/2001 | Kamiya et al. .............. 701/50 |
| 6,285,342 B1 | 9/2001 | Brady et al. |
| 6,294,997 B1 | 9/2001 | Paratore et al. |
| 6,318,949 B1 * | 11/2001 | Seaberg ................... 414/623 |
| 6,320,509 B1 | 11/2001 | Brady et al. |
| 6,346,881 B1 | 2/2002 | Davidson |
| 6,441,740 B1 | 8/2002 | Brady et al. |
| 6,496,806 B1 | 12/2002 | Horwitz et al. |
| 6,529,799 B1 * | 3/2003 | Paulk et al. ................ 700/227 |
| 6,600,418 B1 | 7/2003 | Francis et al. |
| 6,669,089 B1 | 12/2003 | Cybulski et al. |
| 6,693,511 B1 | 2/2004 | Seal |
| 6,693,539 B1 | 2/2004 | Bowers et al. |
| 6,707,376 B1 | 3/2004 | Patterson et al. |
| 6,707,381 B1 | 3/2004 | Maloney |
| 6,857,493 B1 * | 2/2005 | Shupp et al. ............... 180/168 |
| 2002/0130817 A1 | 9/2002 | Forster et al. |
| 2003/0025027 A1 | 2/2003 | Ebisawa et al. |

(Continued)

FOREIGN PATENT DOCUMENTS

EP   1 375 172 A1   1/2004

(Continued)

OTHER PUBLICATIONS

Ashton, Kevin, "Embedding the Internet in Everyday Products", The X Internet: The Next Voyage available at www.forrester.com/Events/Speech/0,5179,309-783-alos,00.html, Nov. 2001, 2 pages, Forrester Research, Inc., USA.

(Continued)

*Primary Examiner*—Jared J. Fureman
*Assistant Examiner*—Edwyn Labaze
(74) *Attorney, Agent, or Firm*—Senniger Powers (57) ABSTRACT

Automatically adjusting parameters of a lifting device for a material to be lifted. An interrogator module reads data from a data tag attached to an object. The data includes an identifier associated with the object. A database module retrieves a value from a memory area based on the read identifier. The value corresponds to the parameter of the lifting device. An adjustment module adjusts the parameter of the lifting device as indicated by the retrieved value. Adjusting the parameters of the lifting device for a particular material improves handling of the material thereby reducing waste of the material and delay in processing the material.

36 Claims, 4 Drawing Sheets

U.S. PATENT DOCUMENTS

| | | |
|---|---|---|
| 2003/0117268 A1 | 6/2003 | Hewitt et al. |
| 2003/0141117 A1 | 7/2003 | Jones |
| 2003/0149373 A1 | 8/2003 | Reade et al. |
| 2003/0150908 A1 | 8/2003 | Pokomy et al. |
| 2003/0150909 A1 | 8/2003 | Markham et al. |
| 2003/0154144 A1 | 8/2003 | Pokomy et al. |
| 2003/0155415 A1 | 8/2003 | Markham et al. |
| 2003/0156501 A1 | 8/2003 | Spindel et al. |
| 2003/0158795 A1 | 8/2003 | Markham et al. |
| 2003/0158891 A1 | 8/2003 | Lei et al. |
| 2004/0102869 A1* | 5/2004 | Andersen et al. ........... 700/215 |
| 2004/0102870 A1 | 5/2004 | Andersen et al. |
| 2004/0197178 A1* | 10/2004 | Osterloh et al. ............ 414/607 |

FOREIGN PATENT DOCUMENTS

| | | |
|---|---|---|
| WO | 0352381 A1 | 1/1990 |
| WO | WO 00/40496 A1 | 7/2000 |
| WO | WO 01/80146 A1 | 10/2001 |

OTHER PUBLICATIONS

Brock, David L., "Integrating the Electronic Product Code (EPC) and the Global Trade Item No. (GTIN)", White Paper available at www.autoidcenter.org/pdfs/MIT-WUTOID-WH-004.pdf, Nov. 1, 2001, MIT AUTO-ID Center, Massachusetts Institute of Technology, Cambridge, MA, USA.

Lindsay, Jeff et al., "RFID Locating Systems for Linking Valued Objects With Multimedia Files", Dec. 23, 2003, published at IP.com as Document 21113D.

Losefsky, Pam, "It's Here—Alien Technology", The McCombs School of Business Magazine, 2001, 3 pages, University of Texas, USA.

Michal, Neal, "RFID-Assisted Feed Forward Systems for Roll Goods", May 21, 2004, 3 pages, published at IP.com as Document 000028567D.

Sarma, Sanjay, "Towards the 5¢ Tag", Nov. 1, 2001, 19 pages, MIT AUTO-ID Center, Massachusetts Institute of Technology, Cambridge, MA, USA.

Schoenberger, Chana R., "The Internet of Things; Chips at the Checkout Counter", Forbes Magazine, Mar. 18, 2002, vol. 169, Issue 5, 3 pages, Forbes, USA.

Starkman, Dean, "International Paper and Motorola Agree to Put Microchips in 'Smart Packages'", Wall Street Journal, Apr. 13, 2000, 2 pages, The Wall Street Journal, USA.

Vanscoy, Kayte, "They Know What You Eat", Smart Business, 2001, 2 pages, Mindfully.org, USA.

Hansson, "Industrial Robot Lends a Hand in a Swedish Library," ABB Review, ABB ASEA Brown Boveri, Zurich, No. 3, 1995, pp. 16-18.

* cited by examiner

AUTOMATICALLY ADJUSTING PARAMETERS OF A LIFTING DEVICE BY IDENTIFYING OBJECTS TO BE LIFTED

FIELD OF THE INVENTION

Embodiments of the invention generally relate to the field of material handling equipment. In particular, embodiments of the invention relate to a system and method for automatically adjusting parameters of material handling equipment for a particular material to be handled.

BACKGROUND OF THE INVENTION

Raw materials such as rolls of nonwoven, film, and paper materials are commonly used in the production of many articles. For example, disposable diapers may employ rolls of breathable cover materials, highly porous inner linings, hook and loop materials for fastening systems, elastomeric components, tissue webs, and other webs for their manufacture. For any material, the properties and/or form of the material may vary from batch to batch, or even within a single batch. For example, the roll size, mass, and basis weight may vary. In addition, there may be defects present in different areas of different rolls.

In some manufacturing systems, standard settings used in the processes that employ the material typically are not adapted to prevent difficulties that might arise from variability in material properties. In intelligent manufacturing systems, event-based information obtained during the production of goods can be used in a feed-forward process control system to adapt operating conditions to reduce waste and delay (see, for example, US Patent Publication No. U.S. 20030155415-A1, "Communication between Machines and Feed-Forward Control in Event-Based Product Manufacturing," published Aug. 21, 2003 by Markham et al.). However, extensions of such concepts for improved manufacturing and material handling are desired.

For example, material handling equipment or other lifting devices such as forklifts or hoists move materials to needed locations in a manufacturing facility. Some of the lifting devices that move the materials have a variety of adjustments that an operator presently makes manually. Several problems are encountered in handling the materials due in part to the wide variety of weights that may be encountered (e.g., depending on the grade of material) and the need to make such changes manually. For example, the material weight may be greater than anticipated, resulting in damage to the material (e.g., dropping) as the lifting device operator makes manual adjustments to handle the particular material.

Accordingly, there is a need for systems and methods that automatically and accurately determine and adjust parameters of the lifting device to improve raw material handling.

SUMMARY OF THE INVENTION

In order to solve these and other needs in the art, the inventors hereof have succeeded at designing systems and methods for automatically adjusting parameters of a lifting device for a material to be lifted. Embodiments of the present invention include radio frequency identification (RFID) of values for the parameters. RFID tags added to the material include the values for the material or include an identifier which is linked to the values stored in another memory area. Adjusting the parameters of the lifting device for a particular material improves handling of the material thereby reducing waste of the material and delay in processing the material.

In one form, a system for use with a lifting device has an adjustable parameter relating to handling of the object by the lifting device. The system includes a data tag attached to an object to be lifted by the lifting device. The data tag stores a value associated with the adjustable parameter. The system also includes an interrogator module linked to the lifting device. The interrogator module communicates with the data tag to obtain the value and adjust the parameter as a function of the value obtained from the data tag.

In another form, a system for use with a lifting device has an adjustable parameter relating to handling of the object by the lifting device. The system includes a data tag attached to an object to be lifted by the lifting device. The data tag stores an identifier. The system also includes a memory area that correlates the identifier with a value associated with the parameter. The system also includes an interrogator module linked to the lifting device. The interrogator module communicates with the data tag to obtain the identifier, communicates with the memory area to retrieve the value based on the obtained identifier, and adjusts the parameter responsive to the retrieved value.

In yet another form, a computerized method automatically adjusts a parameter of a lifting device for an object to be lifted. The parameter is related to handling of the object by the lifting device. The computerized method includes reading data from a data tag attached to an object. The data includes an identifier associated with the object. The method also includes retrieving a value from a memory area based on the read identifier. The value corresponds to the parameter of the lifting device. The method also includes adjusting the parameter of the lifting device as indicated by the retrieved value.

In still another form, a computerized method automatically adjusts a parameter of a lifting device to an object to be lifted. The parameter is related to handling of the object by the lifting device. The computerized method includes reading data from a data tag attached to an object. The data includes a value corresponding to the parameter of the lifting device. The method also includes adjusting the parameter of the lifting device as indicated by the read value.

In another form, one or more computer-readable media have computer-executable components for automatically adjusting a parameter of a lifting device to an object to be lifted. The parameter is related to handling of the object by the lifting device. The components include an interrogator module for reading data from a data tag attached to an object. The data includes an identifier associated with the object. The components also include a database module for retrieving a value from a memory area based on the identifier read by the interrogator module. The value corresponds to the parameter of the lifting device. The components also include an adjustment module for adjusting the parameter of the lifting device as indicated by the value retrieved by the database module.

Alternatively, the invention may comprise various other methods and apparatuses.

Other features will be in part apparent and in part pointed out hereinafter.

BRIEF DESCRIPTION OF THE DRAWINGS AND TABLES

TABLE 1 illustrates exemplary data that may be stored on a data tag associated with a material.

TABLE 2 illustrates a table in an exemplary database that correlates a material code with parameter values for various adjustable parameters of a lifting device.

Corresponding reference characters indicate corresponding parts throughout the drawings.

DETAILED DESCRIPTION OF THE INVENTION

A typical "power pack" includes a wrapped collection of multiple thin rolls of material (e.g., nonwoven webs) that were prepared by slitting a wider roll. The thin rolls are put in a stack with flat headers (e.g., cardboard disks), wrapped in plastic, and moved by forklift to needed locations in a manufacturing facility. The power pack made from nonwoven materials may weight about 400 lbs, while a roll of similar size made from dense paper may weigh about 4000 lbs. The same lifting devices (e.g., forklifts, lift trucks) are used to lift both materials in many mills. The lift truck has an adjustment on the front of the truck that selects the clamping force used to lift the rolls. If the driver does not get off the truck to adjust the clamping force, then the driver may use a "one-force-fits-all" approach in which the light power pack is over compressed as it is lifted and moved. Over compression sometimes pops out the bottom header, resulting in damage to the rolls. Further, over compression may permanently deform the slits within the power pack causing eccentricity in the roll. An eccentric roll may cause drastic tension disturbances, web breaks, or quality defects as the roll is unwound into a converting process.

Over compression may also squeeze air out of the rolls while they are lifted, allowing air to be sucked back in when the rolls are set on the ground again. As the air is pulled back into the power pack, debris and dirt may enter, which causes contamination and waste of the bottom roll in a stack. There is a need for a system that automatically adjusts to an object to be lifted.

In one embodiment, the invention includes material handling equipment that automatically adjusts to an object to be lifted. For example, the invention includes a lifting device such as forklift, hoist, or other roll-handling hardware enabled with a means for communicating with an object to be handled. In one embodiment, a manufacturing process uses the object to make a product. The invention is operable with any object or material to be transported. An exemplary lifting device for use in the invention includes a hoist for roll handling disclosed in commonly owned U.S. patent application Ser. No. 10/403,188, "Adjustable Roll Handling Hoist," filed Mar. 31, 2003 by Briggs et al., which is herein incorporated by reference. However, the invention is adaptable to any material handling equipment such as forklifts, lift trucks, fork-trucks, hoist, cranes, roll handlers (e.g., lifting devices mounted from overhead rails with a spindle and lifting mechanisms that allow operators to lift rolls and mount them on the spindles of machines), hoist-based roll handlers, winches, cutters, feeders, heaters, presses, and the like.

Figure 1:
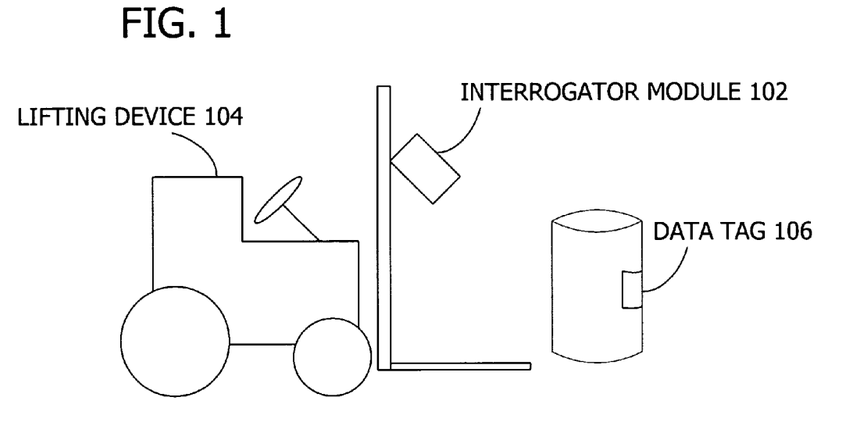
FIG. 1 illustrates an exemplary embodiment of a system according to an embodiment of the invention in which a lifting device has an interrogator module for communicating with an object to be lifted.

Referring first to FIG. 1, an exemplary embodiment of a system according to an embodiment of the invention includes an interrogator module 102 attached to a lifting device 104. The invention may include the interrogator module 102 with or without the lifting device 104. For example, the interrogator module 102 and associated hardware and software may take the form of a retrofit kit for lifting devices already in service. The interrogator module 102 communicates with an object to be lifted, and adjusts a parameter of the lifting device 104 according to or in response to data received from the object.

The interrogator module 102 may be mounted on the lifting device 104 or linked to the lifting device 104 via a wired or wireless connection. For example, the interrogator module 102 may be located where the lifting device 104 lifts the materials for transport (e.g., located at the end of processing line such as a conveyor belt, attached to the back end frame of a delivery truck, etc.) The interrogator module reads the tag on the object to be transported and sends a signal to an approaching lifting device to adjust a parameter of the lifting device prior to the lift. In this embodiment, the quantity of interrogator modules is reduced (e.g., one interrogator module 102 for all lifting devices picking up materials at any one location instead of one interrogator module 102 per lifting device 104).

A data tag 106, smart tag, or other identification means (e.g., a bar code) may be placed by hand or by machinery on each roll in the power pack and/or on the power pack wrapping to convey information about the group of rolls. For example, each power pack may include one data tag 106 to allow data to be associated with each individual power pack. The data tag 106 may be affixed inside or outside the stretch wrap surrounding the power pack. The data tag 106 may also be attached to the top cardboard header by the header manufacturer. The data tag 106 may also be placed on top of the top slit in the power pack before the header is placed. Alternatively or in addition, there is one data tag 106 per slit. For example, the data tag 106 may be stored on a label associated with the slit, or the data tag 106 may be embedded inside or outside of the core.

The invention is operable with any form of data tag 106 including, but not limited to, a smart tag and an active or passive radio frequency identification (RFID) tag. The data tag 106 stores identification information (e.g., a data tag identifier or a roll identifier) that corresponds to roll property information to be retrieved from a database (e.g., a secure database) or other memory area. For example, the identification information may act as a pointer or other index in a table storing the property information. Alternatively or in addition, the data tag 106 may include the roll information directly by storing, for example, roll information (e.g., optimum clamping pressure) on a read-write data tag. This embodiment may be suited for environments in which most of the lift trucks in the environment are very close in design. The roll information includes, but is not limited to, any of the following data: details of product type, roll size and mass, roll weight, material composition, specification of a machine or spindle to process the roll, event-based data describing events such as splices or quality defects (e.g., location of the quality defect), basis weight, and other material properties of the roll on the average or at various locations for which measurements are available. Alternatively or in addition, the invention uses the obtained or received property information to determine the adjustment to be made to the lifting device 104. For example, an optimum clamping pressure may be determined responsive to a weight value associated with the roll.

In one embodiment, the data tag 106 stores anticipated values for one or more of the following: average wound roll density, roll inertia, interlayer pressure (e.g., nominal and peak), machine direction strain (e.g., at the core, through the middle plateau of each slit, and at the outside diameter of the roll), and third order polynomial expressions for interlayer pressure and stored machine direction strain.

In another embodiment, another data tag or other means for storing data stores environmental conditions associated with a shipment of the power packs. For example, a shipment of the power packs (e.g., via a tractor trailer), includes an environmental module and RFID tag assembly. The environmental module reads and stores temperature, humidity, and time values associated with the environmental conditions to which the shipment of power packs was subjected. At the processing plant, the environmental values are then retrieved and uploaded to a database for calculations to update any stored lifting device parameter values.

An exemplary power pack has eleven slits, a 44-inch roll diameter, a 6.75-inch core interior diameter, 106-millimeter wide slits, a slit weight of 49.4 pounds, and total power pack weight of 543.4 pounds. In this embodiment, a typical cylinder pressure equals 208 pounds per square inch (psi).

TABLE 1 below illustrates exemplary data that may be stored on the data tag 106 associated with a material.

TABLE 1

A List of Exemplary Parameters and Values.

| PARAMETER | PARAMETER VALUE |
| --- | --- |
| Clamping pressure amount | 208 psi |
| Mass | 543 lbs |
| Product Type | Containment Flap |
| Material Composition | 0.65 osy |
| Destination Machine | Infant Care |

In one embodiment, the value are organized into the following categories: handling values, material value for the process values. In example of Table 1, the value for the clamping pressure amount parameter is a handling value while the values for mass, product type, and material composition parameters are material values. The value for the destination machine parameter is a process value.

The data tag 106 may be associated with the roll in several ways. The data tag 106 may be present in the core of a roll, on a portion of the material such as the leading or trailing edge, attached to a wrapping around the roll, or attached to a box or other packaging material associated with the roll.

The information in the tag may be used to assist in routing of the roll. The data tag 106 may be read by scanners in the lifting device 104 and at various other locations, such as loading docks, hoists and spindles, and warehouses, permitting good visibility of the power pack and/or its individual rolls through the manufacturing supply chain. For example, information about a particular roll may be read by an operator as a data scanner retrieves the identification information from the tag and automatically finds a database entry associated with the identification information that specifies where the particular roll should be placed (e.g., on what machine or what spindle). In one embodiment, an alarm or other indication is made if a particular roll is routed incorrectly.

The group of rolls in a power pack may be moved together. One or more data tags for the group store data such as the total mass and common characteristics of the group. Since the group of rolls in the power pack typically comes from a single unslit roll, the average mechanical and other properties may be held in common in some embodiments, though in some cases cross-direction variability in material properties results in length-averaged properties for outer slit rolls that differ from the inner slit rolls. But such information about cross-direction variability is also associated with a single tag applied to a group in a power pack, as well as to individual rolls.

Many other measured or reported parameters are associated with an individual roll or group of rolls. Such information includes the location of breaks in the web, material properties of the web, data about events encountered during slitting, and so forth. For example, data about the stresses within the wound roll are associated with the data tag 106 (e.g., linked to the electronic product code of a passive data tag or written to a read/write data tag with sufficient memory), which are fed forward to a converting operation to allow converting conditions (e.g., web tension, unwind speed, etc.) to be automatically adjusted in anticipation of web conditions for improved efficiency. Wound roll stresses are obtained from computer models, direct measurement, or from sensors embedded in the roll. The data tag 106 references a database (e.g., a secure database) to obtain the wound roll stress information or references a read/write data tag with sufficient memory to store this information. Time, temperature, and humidity data are also logged and stored on or associated with the identifying tag.

Radio Frequency Identification (RFID)

In one embodiment, the lifting device 104 communicates with the object to be handled via a radio frequency identification (RFID) reader attached to the lifting device 104. The RFID reader interrogates an RFID tag or other data tag affixed to the object to be lifted. RFID smart tag technology is known and understood by those skilled in the art, and a detailed explanation thereof is not necessary for purposes of describing the method and system according to the present invention.

With RFID or other smart tag technology, a vendor may associate a unique identification code with a batch of raw materials, and enter physical property data into a database in which the data is associated with the identification code. When the raw material shipment is received at a manufacturing facility, an RFID scanner may automatically scan the RFID chip and retrieve the associated information from the database, verify that usable raw material has been received at the correct facility, provide quality information, and so forth.

In general, RFID systems include readers and tags in which the tags generate an electromagnetic response to an electronic signal from a reader. The response signal is read by the reader, typically with a readable range on the order of a few feet, though broader or narrower ranges are possible. The signal generated by the smart tag includes information (an electronic product code) that identifies the tag or the article comprising the tag.

RFID technology refers to passive smart tags (miniature antennae-containing tags requiring no internal power supply) that may be embedded in or attached to a product or material to convey information that may be read by a scanner. Generally, conductive or passive smart tags consist of a semiconductor, a coiled, etched, or stamped antennae, a capacitor, and a substrate on which the components are mounted or embedded. A protective covering is typically used to encapsulate and seal the substrate.

RFID systems for improved manufacturing have been proposed for systems including the PIPE/STORM systems disclosed in commonly owned U.S. patent application Ser. No. 10/306,794, "Communication Between Machines and Feed-Forward Control in Event-Based Product Manufacturing," filed Nov. 27, 2002 by Markham et al., which is herein incorporated by reference.

Details about suitable RFID technology is also given in "RFID Locating Systems for Linking Valued Objects with Multimedia Files," Jeff Lindsay et al., published at IP.com as Document 21113D, Dec. 23, 2003.

By way of example, a system for tracking information based on radio frequency identification (RFID) is discussed in U.S. Pat. No. 6,294,997, "RFID Tag Having Timing and Environment Modules," issued Sep. 25, 2001 to Paratore and Maltseff.

Examples of potential applications for smart chips attached to products and wireless communication systems are described by C. R. Schoenberger in "The Internet of Things," *Forbes*, Mar. 18, 2002, pp. 155–160. Exploiting the potential of low cost microchips and wireless communication technology, products may be embedded with microchips that replace bar codes and provide much more information than bar codes. Sensors transmit an electronic signal to a nearby microchip and elicit a response signal that is detected, conveying information about the product associated with the microchip.

RFID and other identification tools convey detailed information about roll goods to facilitate improved operation and control of processes using the rolls. By using RFID tags attached to the power pack or the individual rolls, an RFID reader on the lift truck or hoist reads information about the power pack to obtain summary information about the collection of rolls. Clamping force of the truck or other parameters associated with a hoist automatically adjust to properly handle the roll and prevent damage or contamination. Position of the roll may also be accurately determined.

It is to be understood that many other technologies are potential substitutes for the RFID embodiments disclosed herein. For example, RFID readers could be replaced with optical scanners, image analysis devices, arrays of chemical detection devices, and the like to allow other technologies for reading identification means to be applied.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device on a chip coupled with an antenna. The SAW device converts a radio signal to an acoustic wave, modulates it with an identification code, then transforms it to another radio signal that is emitted by the smart tag and read by a scanner. The identification code of the smart tag is extracted from the radio signal. RFSAW, Inc. (Dallas, Tex.) also provides minute Surface Acoustic Wave (SAW) RFID devices that may be used within the scope of the present invention.

Another related technology is ultra-wide band (UWB) technology. UWB technology permits wireless communication between objects using low-power electromagnetic transmissions. However, receivers and transmitters generally are both active but use very low power, typically less than that of radio frequency noise, relying on intermittent pulses which cover a broad band of frequencies rather than transmissions of a particular frequency. UWB technology may provide much higher spatial capacity (information transmission per unit area) than other wireless standards such as BLUETOOTH brand computer communication services or Institute of Electronics and Electrical Engineering (IEEE) 802.11a or 802.11b.

Figure 2:
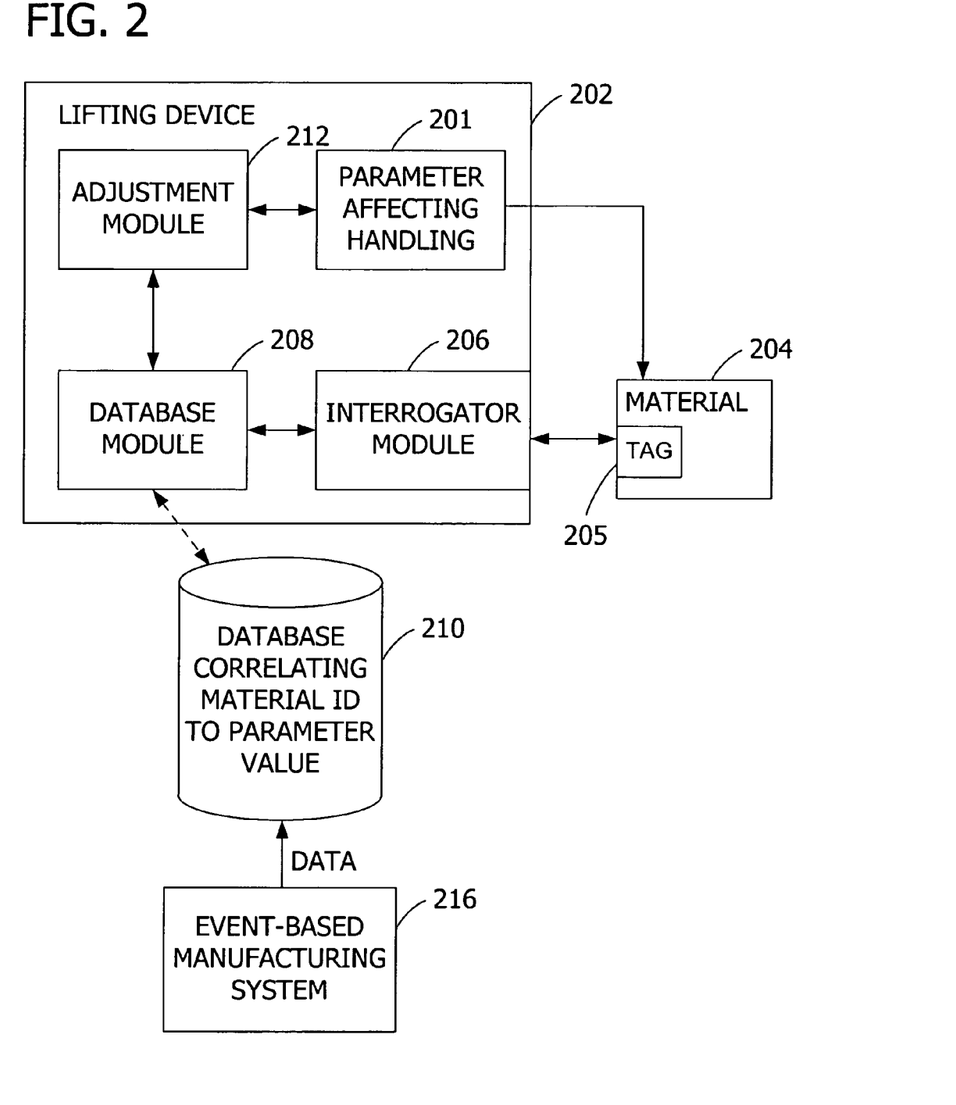
FIG. 2 is a diagram of an exemplary embodiment of a system according to an embodiment of the invention adapted to adjust a parameter of a lifting device based on an object to be lifted.

Referring next to FIG. 2, a block diagram illustrates an exemplary embodiment of a system according to an embodiment of the invention adapted to adjust a parameter 201 of a lifting device 202 such as lifting device 104 based on an object or material 204 to be lifted. The material 204 to be handled has a data tag 205 associated therewith. An interrogator module 206 such as interrogator module 102 on the lifting device 202 communicates with the data tag 205 to obtain information stored on the tag 205. A database module 208 processes the information received by the interrogator module 206. The database module 208 determines whether the information received by the interrogator module 206 includes property information about the material 204 or includes a material code or other identifier associated with the material 204. The database module 208 uses the material code to obtain the property information. For example, the database module 208 may use the material code to access a database 210 or other memory area to obtain the property information (e.g., a parameter value). The database 210 or other memory area correlates the material code to property information (e.g., via a table). In this manner, the database module 208 directly or indirectly obtains property information about the material 204.

Figure 3:
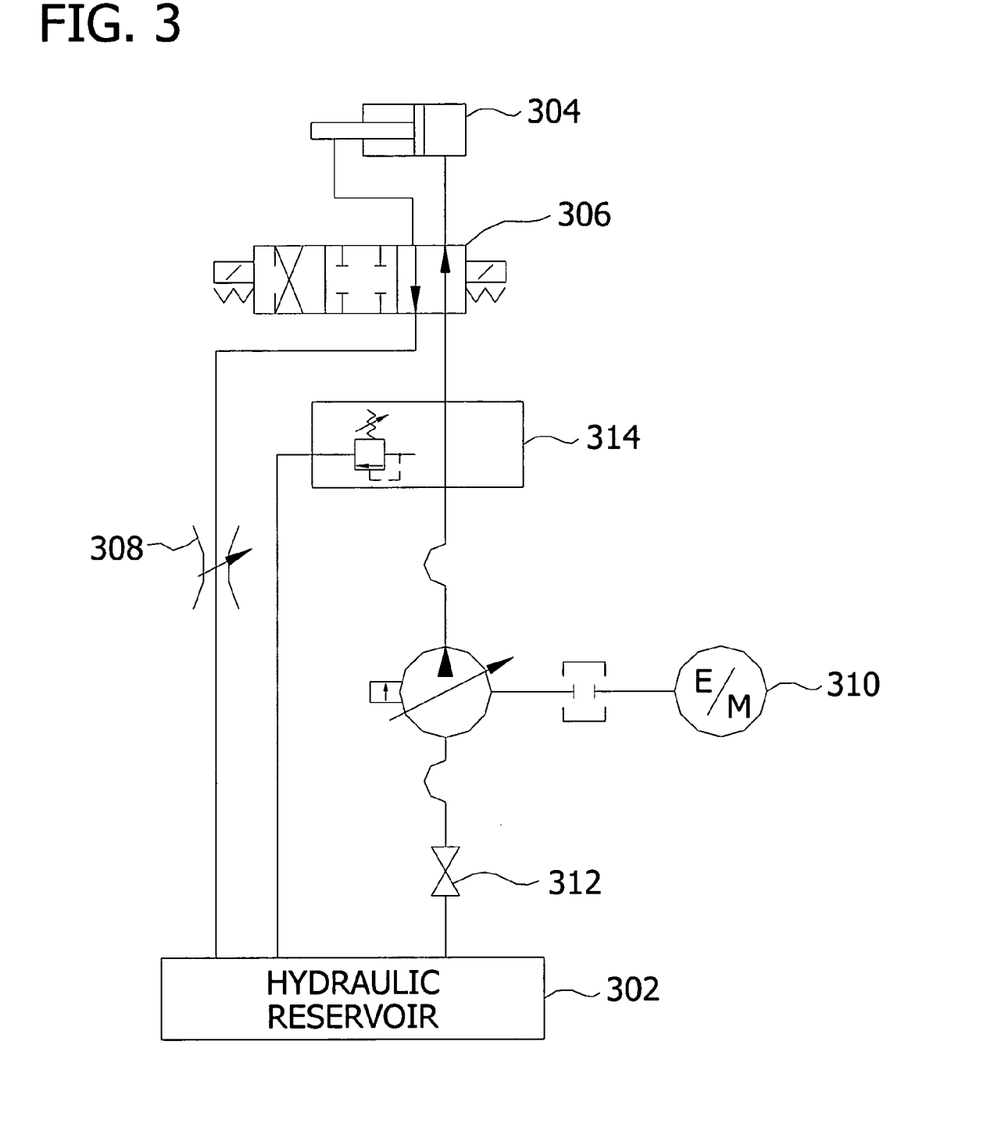
FIG. 3 is a diagram of a hydraulic circuit for remote adjustment of load capability for a lifting device.

An adjustment module 212 associated with the lifting device 202 adjusts the parameter 201 affecting the handling of the material 204 responsive to the property information. For example, the adjustment module 212 may include electrical controls operating a pressure controller. Further, the parameter 301 may include a hydraulic clamp device controlled by the pressure controller. In this example, the data 205 stores the weight of the power pack. The electrical controls calculate the pressure needed to lift the material 204 based on various factors. For example, the factors may include, but are not limited to, the type of parameter 201 (e.g., type of clamping device), the size of the hydraulic cylinder, the mechanized advantage of the clamping assembly (e.g., one to one, ten to one), the effective coefficient of friction, and the desired safety factor. Exemplary types of clamping devices include box clamps or roll clamps. The effective coefficient of friction may be experimentally determined. The desired safety factor may be twenty percent, but is adjustable as needed. Clamping pressure may be calculated using the exemplary formula (1) below.

$$(\text{Power pack weight}/(\text{cylinder area}*\text{coefficient of friction}))*\text{safety factor}=\text{cylinder pressure} \quad (1)$$

Assuming a 2" cylinder diameter, 1.0 for the coefficient of friction, and a 20% safety factor (i.e., 1.2), the cylinder pressure is calculated as in formula (2) below.

$$(543.4 \text{ lbs}/(3.1425 \text{ sq in}*1.0))*1.2=208 \text{ psi} \quad (2)$$

In one embodiment, the interrogator module 206, database module 208, and adjustment module 212 include software or other computer-executable instructions for performing the functionality recited herein. Further, the modules illustrated in FIG. 2 may include a memory area and a processor to store and execute, respectively, the computer-executable instructions. While the modules illustrated in FIG. 2 are shown to be associated with the lifting device 202, some or all of the modules may be located remotely from the lifting device 202 and/or may execute remotely from the lifting device 202. For example, the database module 208 and/or the adjustment module 212 may be located remotely from the lifting device 202 and communicate with the other modules via wireless signals. In addition, the organization and function of each module illustrated in FIG. 2 are merely exemplary. The invention is operable with any quantity of modules and division of labor among the modules to achieve the functionality described herein.

Referring next to FIG. 3, a block diagram illustrates an exemplary hydraulic circuit for remote adjustment of the load capability of a clamp affixed to a lifting device. Hydraulic circuits are well known in the art. The hydraulic circuit includes a hydraulic reservoir 302, a clamping cylinder 304, a solenoid valve 306 controlling the clamping cylinder 304, flow control 308 between the hydraulic reservoir 302 and the solenoid valve 306, a variable displacement hydraulic pump coupling/motor 310, a valve 312 connecting the hydraulic reservoir 302 with the hydraulic pump 310, and a pressure relief valve 314 between the hydraulic pump 310 and the solenoid valve 306 to control clamp pressure. The hydraulic circuit is attached to the lifting device.

The hydraulic circuit of FIG. 3 differs from known hydraulic circuits at least in that the pressure relief valve 314 is set by control parameters obtained or calculated from an RFID tag on an object to be lifted. For example, an adjustment module on the lifting device such as adjustment module 212 calculates the clamping pressure as a function of the weight of the object to be lifted and automatically adjusts the pressure relief valve 314 to the calculated pressure. The weight of the object is stored on a data tag associated with the object. In another embodiment, the pressure relief valve 314 or its control is conveniently located near an operator of the lifting device such that the operator manually adjusts the clamping pressure. A display (e.g., digital) shows the weight of the object (obtained from the data tag) and the operator consults a table correlating object weight to clamping pressure to determine the proper clamping pressure based on the weight.

In another embodiment, a load cell determines the load applied by the clamp and displays the determined load to the operator. Controls of the invention allow the operator to increase the clamp pressure until the desired load is achieved. In yet another embodiment, linear position feedback regarding the clamp is provided to the operator. Controls of the invention allow the operator to close the clamp until a target dimension (e.g., position) is achieved.

Table 2 below illustrates a table in an exemplary database such as database 210 that correlates a material code with parameter values for various adjustable parameters such as parameter 201 of the lifting device 202.

TABLE 2

Correlating Parameters and Parameter Values with Material Codes.

| MATERIAL CODE | PARAMETER | PARAMETER VALUE |
|---|---|---|
| 237532 | Clamping pressure | 208 psi |
| 996434 | Mass | 543 lbs |
| 553128 | Product Type | Containment Flap |
| 668932 | Material Composition | 0.65 osy |
| 434365 | Destination Machine | Infant Care |

In one embodiment, the material code may include an electronic product code with two parts: a vendor code assigned by the manufacturer to the vendor and an additional batch code created by the vendor to identify the batch of raw material (e.g., a roll of material, a barrel of fluid, a bale, or other unit). The batch code may be further subdivided. For example, the vendor code may include a predetermined number of bits, such as 16 bits. The batch code may include another predetermined number or variable number of bits, such as 12, 16, 24, or 32. A 24-bit batch code and a 16-bit vendor code may be combined into a single 40-bit material code.

In one embodiment, the database 210 is populated with event data from an event-based manufacturing system 216. The invention is operable with the intelligent, event-based manufacturing system 216 for tracking production information from one or more manufacturing facilities. For example, the invention is operable with the PIPE (Process Information Per Event) system as disclosed in commonly owned U.S. patent application Ser. No. 10/306,794, "Communication Between Machines and Feed-Forward Control in Event-Based Product Manufacturing," filed Nov. 27, 2002 by Markham et al., previously incorporated by reference herein. PIPE collects, stores, and reports production information such as converting machine productivity, waste, and delay information on an event basis (e.g., related to the manufacturing of rolls). In this system, machine data from sensors and other control means are continually monitored for events related to productivity and/or product quality, such as product waste, machine down time, machine slow downs, product maintenance, machine failure, etc.

An "event," as used herein, refers to any discrete occurrence during the manufacturing process. For example, an event includes an incident that may affect the productivity of a process or machine in use to produce a product, or that may adversely affect the quality of the product being produced. However, an event is not necessarily adverse. Events that adversely affect the productivity of a process or machine by increasing delay are "adverse productivity events." Productivity events that lead to waste are "waste events," while those that cause delay are "delay events." Events that adversely affect the quality of a product are "adverse quality events." As used herein, "intermediate events" may refer to incidents during a first process for the production of an intermediate product to be used as a raw material (starting material) in a second process for the production of a finished product (or another intermediate product or product component), wherein the incident in the first process may affect the productivity of the second process or adversely affect the quality of the product of the second process. Thus, an intermediate event in a first process may lead to an adverse productivity event or an adverse quality event in a second process. An adverse quality event may also refer to incidents that may adversely affect the quality of an intermediate product, such that the risk of rejection of the product by a subsequent user (including an industrial user) is increased. The PIPE system may be used to track any or all types of events, including events from multiple machines and processes wherein intermediate products from early processes or machines are used as raw materials in later processes or machines, and optionally wherein the event data for the intermediate products are used by operators or process control equipment to properly execute the subsequent processes based on the events associated with the intermediate product or, in general, with the quality and property attributes of the intermediate product as recorded at least in part with a system including PIPE.

Examples of events may include a web break, a component failure in a machine, a loss of manpower (e.g., inadequate employees present during a shift), a loss of power, a fire, machine shutdown to change a grade ("changeover") or perform routine maintenance, unacceptable quality in raw materials, market curtailment (e.g., inadequate orders or excess inventory), an experimental run, a startup, the splicing in of a raw material, the culling of an individual article, web shifting past a critical point, and the like.

The parameter values for the lifting device 202 may be modified in accordance with the event data captured during processing of the material 204 or object. For example, an increased frequency of dropped rolls may result in an increase in the clamping pressure parameter value stored in the database 210. Similarly, event data indicating an increased frequency of damaged rolls may result in a decreased clamping pressure parameter value.

As used herein, "production information" includes waste data, delay data, machine speed data, product code, and any other data related to production. In some systems, production information is segregated from waste and delay data, even though waste and delay data are considered production information. In general, the invention is operable with any form of waste data, delay data, or other production information or event data. For example, production information includes raw material usage information. Raw material usage information includes, but is not limited to, a raw material lot number, an amount of material in a roll, a time the roll was spliced on or off, a supplier of the material, a number of products produced from the roll of material, and a date the material was produced.

PIPE event data obtained during production are stored in a database such as database 210 associated with descriptor information (e.g., identification information). In general, waste and delay information, as well as other productivity parameters, may be automatically captured on an event basis, stored in the PIPE database, and linked to a power pack via an RFID tag or other data tag (e.g., data tag 205).

A feed forward control system allows the machine to anticipate the problem areas in the roll as they are about to be fed into the machine or any of its unit operations. Once the roll is associated with the machine, information about roll properties is retrieved and fed forward to guide operation of the machine. For example, if the material has a lower than desired tensile strength, the web tension in the machine is adjusted (e.g., by slowing machine speed) to reduce the risk of a web break. If a portion of the web is known to have a splice or other defect, the machine speed is reduced as the defect is encountered to reduce the risk of a break, and optionally any product made with the portion of the web with the defect is automatically discarded or targeted for additional inspection to verify acceptable quality. In addition, a known splice may be culled while unwinding the roll.

Figure 4:
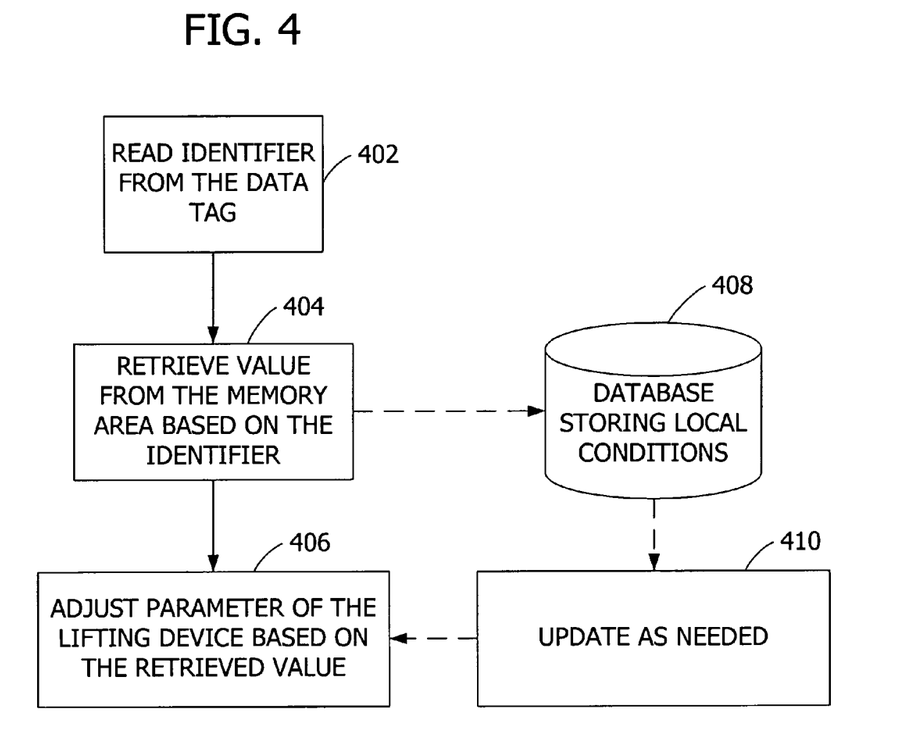
FIG. 4 is an exemplary flow chart illustrating a process according to an embodiment of the invention for adjusting a parameter of a lifting device based on an object to be lifted.

Referring next to FIG. 4, an exemplary flow chart illustrates a method according to an embodiment of the invention for adjusting a parameter of a lifting device based on an object to be lifted. The method includes reading data from a data tag attached to an object at 402. The data includes an identifier associated with the object. The method also includes retrieving a value from a memory area based on the read identifier at 404. The value corresponds to the parameter of the lifting device. The method also includes adjusting the parameter of the lifting device as indicated by the retrieved value at 406.

Alternatively or in addition, the method of FIG. 4 includes additional logic for determining the proper value for the adjustable parameter. In particular, some materials such as pulp, paper, and tissue rolls lose weight as they dry out over time. Similarly, these materials will gain weight in a humid environment. As such, the additional logic in FIG. 4 compensates for these fluctuations. A database 408 (e.g., secure) stores date regarding local conditions such as humidity and temperature, the storage conditions (e.g., wrapped, no wrap), feedback regarding eccentricity in the rolls, and the like. The method includes updating at 410 the value retrieved at 406.

It is to be understood that the order of execution or performance of the methods illustrated and described herein is exemplary and not essential, unless otherwise specified. That is, elements of the methods may be executed or performed in any order, unless otherwise specified, and that the methods may include more or less elements than those disclosed herein. For example, it is contemplated that executing or performing a particular element before, contemporaneously with, or after another element is within the scope of the invention.

Computer-Readable Media

In one embodiment of the invention, any computing device such as those known in the art is suitable for use with the invention. A user may enter commands and information into the computing device through input devices or user interface selection devices well known in the art such as a keyboard and a pointing device (e.g., a mouse, trackball, pen, or touch pad).

The computing device typically has at least some form of computer readable media. Computer readable media, which include both volatile and nonvolatile media, removable and non-removable media, may be any available medium that may be accessed by the computing device. Generally, computer readable media include memory areas for storing data. By way of example and not limitation, computer readable media comprise computer storage media and communication media. Computer storage media include volatile and nonvolatile, removable and non-removable media implemented in any method or technology for storage of information such as computer readable instructions, data structures, program modules or other data, as is well known in the art. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The invention also includes the computing device itself when programmed according to the methods and techniques described herein.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. For purposes of illustration, programs and other executable program components, such as the operating system, are illustrated herein as discrete blocks. It is recognized, however, that such programs and components reside at various times in different storage components of the computer, and are executed by the data processor(s) of the computer. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A system comprising:
a data tag attached to an object to be lifted by a lifting device, said lifting device having an adjustable parameter, said data tag for storing a value defining the adjustable parameter related to handling of the object by the lifting device, wherein the adjustable parameter comprises clamping pressure; and
an interrogator module linked to the lifting device, said interrogator module for communicating with the data tag to obtain the value and adjust the adjustable parameter as a function of the value obtained from the data tag to affect handling of the object by the lifting device.

2. The system of claim 1, wherein the value comprises one or more of the following: a handling value, a material value, and a process value.

3. The system of claim 2, wherein the handling value comprises a clamping pressure amount.

4. The system of claim 2, wherein the material value specifies one or more of the following: size, mass, and material composition.

5. The system of claim 2, wherein the process value identifies a machine to process the object.

6. The system of claim 1, wherein the data tag comprises a radio frequency identification tag.

7. The system of claim 1, wherein the interrogator module comprises a radio frequency identification reader.

8. The system of claim 1, wherein the lifting device comprises one or more of the following: a forklift, a lift truck, a hoist, and a roll handler.

9. The system of claim 1, wherein an event-based manufacturing system obtains the value during a process and stores the value in the data tag.

10. A system comprising:
a data tag attached to an object to be lifted by a lifting device, said lifting device having an adjustable parameter, said data tag for storing an identifier, wherein the adjustable parameter comprises clamping pressure;
a memory area for correlating the identifier with a value defining the adjustable parameter related to handling of the object by the lifting device; and
an interrogator module linked to the lifting device, said interrogator module for communicating with the data tag to obtain the identifier, for communicating with the memory area to retrieve the value based on the obtained identifier, and for adjusting the adjustable parameter responsive to the retrieved value to affect handling of the object by the lifting device.

11. The system of claim 10, wherein the value comprises one or more of the following: a handling value, a material value, and a process value.

12. The system of claim 11, wherein the handling value comprises a clamping pressure amount.

13. The system of claim 11, wherein the material value specifies one or more of the following: size, mass, and material composition.

14. The system of claim 11, wherein the process value identifies a machine to process the object.

15. The system of claim 10, wherein the data tag comprises a radio frequency identification tag.

16. The system of claim 10, wherein the interrogator module comprises a radio frequency identification reader.

17. The system of claim 10, wherein the memory area is populated with data obtained from an event-based manufacturing process.

18. The system of claim 10, wherein the event-based manufacturing process relates to an intended use of the object.

19. A computerized method comprising:
reading data from a data tag attached to an object, said data including an identifier associated with the object;
retrieving a value from a memory area based on the read identifier, said value defining a parameter of a lifting device related to handling of the object by the lifting device, wherein the parameter comprises clamping pressure; and
adjusting the parameter of the lifting device as indicated by the retrieved value to affect handling of the object by the lifting device.

20. The computerized method of claim 19, wherein retrieving the value from the memory area comprises using the identifier to query a database for the value.

21. The computerized method of claim 19, wherein adjusting the parameter of the lifting device as indicated by the retrieved value comprises adjusting the clamping pressure of the lifting device.

22. The computerized method of claim 19, wherein reading data from the data tag attached to the object comprises reading the data from a radio frequency identification tag.

23. The computerized method of claim 19, further comprising storing the value in the memory area during an event-based manufacturing process.

24. The computerized method of claim 19, wherein reading the data from the data tag attached to the object comprises reading the data from one or more smart tags attached to a plurality of rolls of a raw material.

25. The computerized method of claim 19, wherein reading the data from the data tag attached to the object comprises reading one or more of the following: size data, weight data, material composition data, recommended clamping force, and identification information.

26. The computerized method of claim 19, wherein reading the value from the memory area comprises reading one or more of the following from the memory area: a handling value, a material value, and a process value.

27. The computerized method of claim 19, further comprising one or more computer-readable media having computer-executable instructions for performing the method recited in claim 19.

28. The computerized method of claim 27, wherein reading the data from the data tag attached to the object comprises reading one or more of the following: a handling value, a material value, and a process value.

29. A computerized method comprising:

reading data from a data tag attached to an object, said data including a value defining a parameter of a lifting device related to handling of the object by the lifting device, wherein the parameter comprises clamping pressure; and adjusting the parameter of the lifting device as indicated by the read value to affect handling of the object by the lifting device.

30. The computerized method of claim 29, wherein adjusting the parameter of the lifting device as indicated by the read value comprises adjusting the clamping pressure of the lifting device.

31. The computerized method of claim 29, wherein reading the data from the data tag attached to the object comprises reading the data from a radio frequency identification tag.

32. The computerized method of claim 29, further comprising storing the value in the data tag during an event-based manufacturing process.

33. The computerized method of claim 29, further comprising one or more computer-readable media having computer-executable instructions for performing the method recited in claim 29.

34. One or more computer-readable media having computer-executable components comprising:

an interrogator module for reading data from a data tag attached to an object, said data including an identifier associated with the object;

a database module for retrieving a value from a memory area based on the identifier read by the interrogator module, said value defining a parameter of a lifting device related to handling of the object by the lifting device, wherein the parameter comprises clamping pressure; and an adjustment module for adjusting the parameter of the lifting device as indicated by the value retrieved by the database module to affect handling of the object by the lifting device.

35. The computer-readable media of claim 34, further comprising an event module to store the value in the memory area.

36. The computer-readable media of claim 34, wherein the database module retrieves one or more of the following from the memory area: a handling value, a material value, and a process value.

* * * * *